(12) United States Patent
Elliott et al.

(10) Patent No.: US 7,257,182 B1
(45) Date of Patent: Aug. 14, 2007

(54) SYSTEMS AND METHODS FOR PARASITIC SYNCHRONIZATION OF RADIO NETWORKS

(75) Inventors: Brig Barnum Elliott, Arlington, MA (US); Jerry D. Burchfiel, Waltham, MA (US)

(73) Assignee: BBN Technologies Corp., Cambridge, MA (US)

( * ) Notice: Subject to any disclaimer, the term of this patent is extended or adjusted under 35 U.S.C. 154(b) by 886 days.

(21) Appl. No.: 10/274,615

(22) Filed: Oct. 21, 2002

(51) Int. Cl.
*H04L 7/00* (2006.01)

(52) U.S. Cl. .................................................. 375/365

(58) Field of Classification Search .............. 375/365, 375/362, 354; 340/10.1, 10.3, 10.33, 3.1, 340/10.34, 3.2, 825
See application file for complete search history.

(56) References Cited

U.S. PATENT DOCUMENTS

| 5,887,176 A | * | 3/1999 | Griffith et al. ............... 713/320 |
| 5,966,313 A | * | 10/1999 | Sakamoto .................... 708/250 |
| 6,546,065 B1 | * | 4/2003 | Shimosakoda .............. 375/364 |
| 6,594,770 B1 | * | 7/2003 | Sato et al. ................... 713/320 |

OTHER PUBLICATIONS

"History of Ultra Wideband Communications and Radar: Part 1, UWB Communications," Microwave Journal, Jan. 2001, 16 pages.

* cited by examiner

*Primary Examiner*—Pankaj Kumar
(74) *Attorney, Agent, or Firm*—Fish & Neave IP Group Ropes & Gray LLP

(57) ABSTRACT

An ultra-wide band (UWB) radio frequency (RF) receiving device (205) includes a first receiver (305) that receives UWB RF signals, a second receiver (315) that receives an external cue, and a processing unit (330). The second receiver (315) receives an external cue that includes one of a television blanking signal, a zero-crossing of a FM radio transmission, a paging system signal, a zero-crossing of an analog voice transmission, a zero-crossing of an analog video transmission, a cellular telephony control channel signal, a cellular telephony traffic channel signal, a digital sub-band for an AM or FM radio station signal, a digital or analog signal in a short-wave-radio transmission, a digital television signal, a digital or analog signal in a land mobile radio transmission, a radio-navigation signal, a radar signal, a satellite signal, an acoustic event or signal, a magnetic event or signal, or an optical event or signal. The processing unit (330) synchronizes an internal clock of the UWB RF receiving device (205) to the external cue.

28 Claims, 7 Drawing Sheets

SYSTEMS AND METHODS FOR PARASITIC SYNCHRONIZATION OF RADIO NETWORKS

FIELD OF THE INVENTION

The present invention relates generally to radio communication networks and, more particularly, to systems and methods for synchronizing transmitting and receiving nodes in radio communication networks.

BACKGROUND OF THE INVENTION

A common problem for communication between a transmitter and one or more receivers in a radio communication network is called synchronization, in which the clocks at the transmitter and receiver(s) must be aligned so that the receiver(s) can properly interpret its reception of analog waves sent by the transmitter as discrete bits. This synchronization process is illustrated in FIGS. 1A and 1B. First, the transmitter prepares a pattern of short radio frequency (RF) pulses 105 and transmits them at time Ts 110. This pattern 105 is sometimes called the synchronization pattern or sequence. Second, the receiver receives the pulse pattern 105 after the pattern passes through the communications channel and noise, multi-path fading, and interference modify it. Third, the receiver is turned on at some time Tr 120, and the receiver then "looks" at the RF signal 115 it receives and performs some kind of pattern matching algorithm on the received RF signal in order to find a match for the expected transmitted pulse pattern 105 (i.e., the receiver has no knowledge of where pulse pattern 105 will occur in the received RF signal 115).

Once the receiver has found a pattern match 125, it can then synchronize its clock with that of the transmitter. This clock synchronization involves determining the time Ts 110 that the transmitter started transmitting pulse pattern 105 in a common reference time-frame. After the synchronization pattern is detected 130, and then acquired and matched at time Ta 135, both the receiver and transmitter will share a common reference time-frame, and can employ this time-frame for communication.

In ultra-wide band (UWB) radio communication, for example, the synchronization process can result in excessive energy consumption due to the length of time required to power the receiver to acquire the synchronization pattern, and the time required to power the circuitry executing the correlation algorithm. This excessive energy consumption results from two aspects of UWB radio communications: 1) the transmitted pulses are very short; and 2) the space between the pulses can be quite long relative to the pulse width. The short pulses cause the receiver to be powered up for an extended period of time before it acquires the transmitter's synchronization relative to the lengths of the pulses themselves. The long space between the pulses causes the correlation pattern matching to take longer due to a high quantity of noise within a received pattern. The combination of the short UWB pulses and the long intervals between pulses, therefore, leads to relatively large energy consumption for the receiving device when attempting to synchronize with the transmitting device.

Therefore, there exists a need for systems and methods that can reduce energy consumption requirements in a RF receiving device when synchronizing to a transmitting device.

SUMMARY OF THE INVENTION

Systems and methods consistent with the present invention address this and other needs by permitting the use of an external cue to initiate the powering up of receiver and correlation circuitry for acquiring and correlating a synchronization pattern transmitted by a transmitting device in a RF network. By using already existing cues that may be unrelated to, and may be generated outside of, the RF network, a common reference point can be established at which a transmitting node transmits a synchronization pattern and a receiving node powers up its RF transceiver and correlation circuitry. Systems and methods consistent with the present invention, thus, decrease the amount of time the RF transceiver must be powered on for receiving the synchronization pattern, and further decrease the correlation/pattern matching time associated with synchronizing the receiving device. As a result, energy demands on the receiving device can be reduced and, therefore, the receiving device can operate longer on a limited energy supply, such as a battery or fuel cell.

In accordance with the purpose of the invention as embodied and broadly described herein, a method of synchronizing a receiving node to a transmitting node in a network includes receiving an aperiodic external cue at a first receiver of the receiving node, where the aperiodic external cue is unrelated to signals transmitted by the transmitting node. The method further includes powering up a second receiver at the receiving node responsive to receipt of the aperiodic external cue and receiving a synchronization pattern from the transmitting node at the second receiver. The method also includes synchronizing the receiving node to the transmitting node using the synchronization pattern.

In a further implementation consistent with the present invention, a method of synchronizing a receiving node to a transmitting node in a network includes receiving an external cue at a first receiver of the receiving node. The method further includes powering up a second receiver at the receiving node responsive to receipt of the external cue and receiving a synchronization signal from the transmitting node at the second receiver. The method also includes determining when the transmitting node started transmitting the synchronization signal in a reference time-frame common to both the transmitting node and the receiving node.

In an additional implementation consistent with the present invention, a method of synchronizing an UWB RF receiving device to an external cue includes receiving an external cue at a receiver of the UWB RF receiving device, where the external cue includes at least one of a television blanking signal, a zero-crossing of a FM radio transmission, a paging system signal, a zero-crossing of an analog voice transmission, a zero-crossing of an analog video transmission, a cellular telephony control channel signal, a cellular telephony traffic channel signal, a digital sub-band for an AM or FM radio station signal, a digital or analog signal in a short-wave radio transmission, a digital television signal, a digital or analog signal in a land mobile radio transmission, a radio-navigation signal, a radar signal, a satellite signal, an acoustic event or signal, a magnetic event or signal, or an optical event or signal. The method further includes synchronizing an internal clock of the UWB RF receiving device to the external cue.

In a further implementation consistent with the present invention, a method of controlling power consumption in a radio communications device includes powering down a first receiver of the device and receiving an external cue at a second receiver of the device. The method further includes powering up the first receiver of the device responsive to receiving the external cue.

In an additional implementation consistent with the present invention, method of transmitting synchronization data from a radio communications device includes estimating a time at which an external cue will be received at the device and powering on an external cue receiver just prior to the estimated time. The method further includes receiving the external cue, and transmitting the synchronization data responsive to receipt of the external cue.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide mechanisms for using external cues, that may be unrelated to, or generated outside of, an RF network to initiate the powering up of RF receiver and correlation circuitry of a receiving device for acquiring and correlating a synchronization pattern transmitted by a transmitting device in the RF network. The external cues may be used as reference points at which the transmitting device transmits synchronization patterns, and a receiving device powers up its RF transceiver and correlation circuitry to receive the synchronization patterns. The amount of time the RF transceiver must be powered on for receiving the synchronization pattern may, therefore, be decreased, and the correlation/pattern matching time associated with synchronizing the receiving device may also be decreased, thus, reducing energy demands on the receiving device and permitting longer operation on a limited energy supply, such as a battery or fuel cell.

Exemplary Network

Figure 1A:
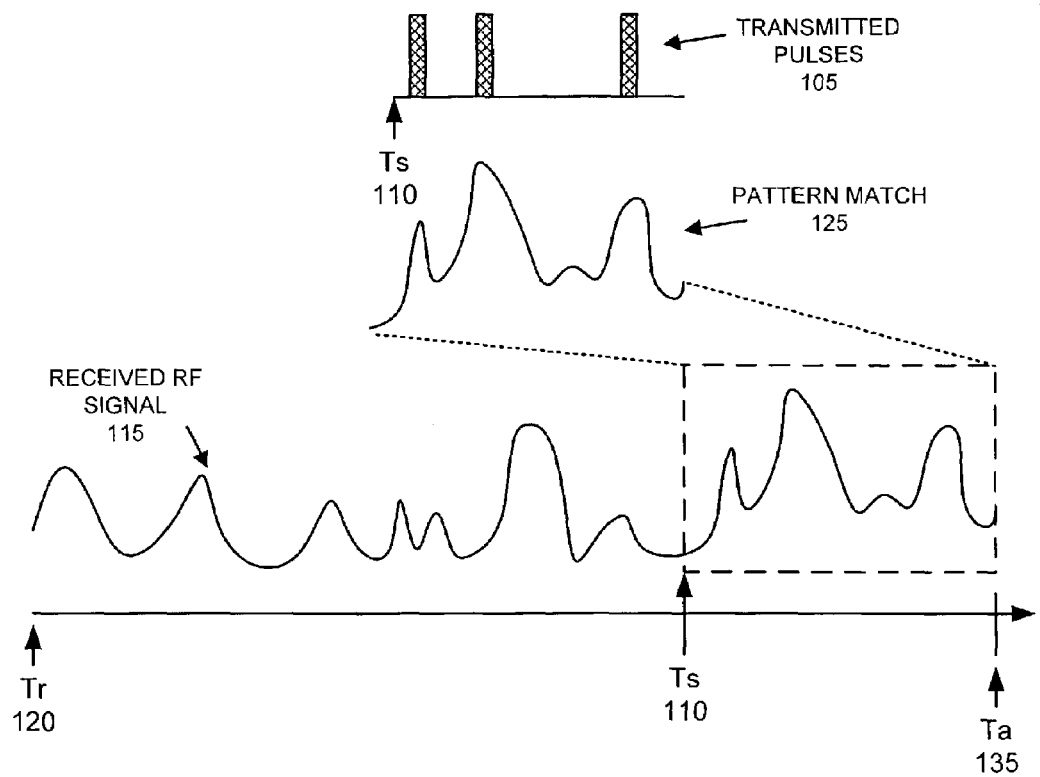
FIGS. 1A and 1B illustrate conventional radio communication device synchronization.
Figure 1B:
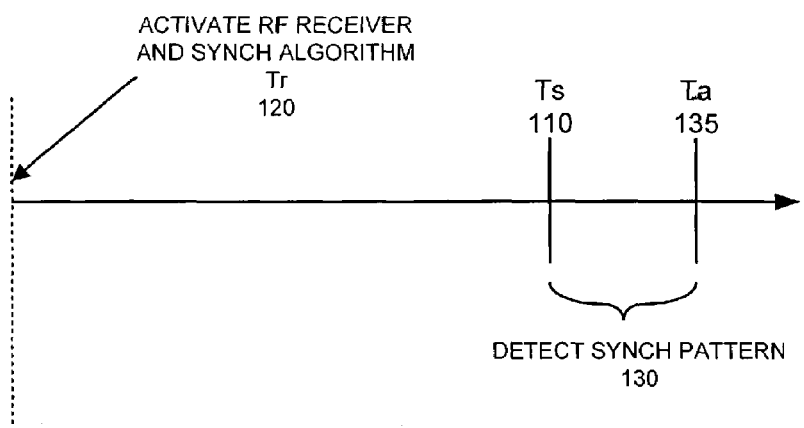
Figure 2:
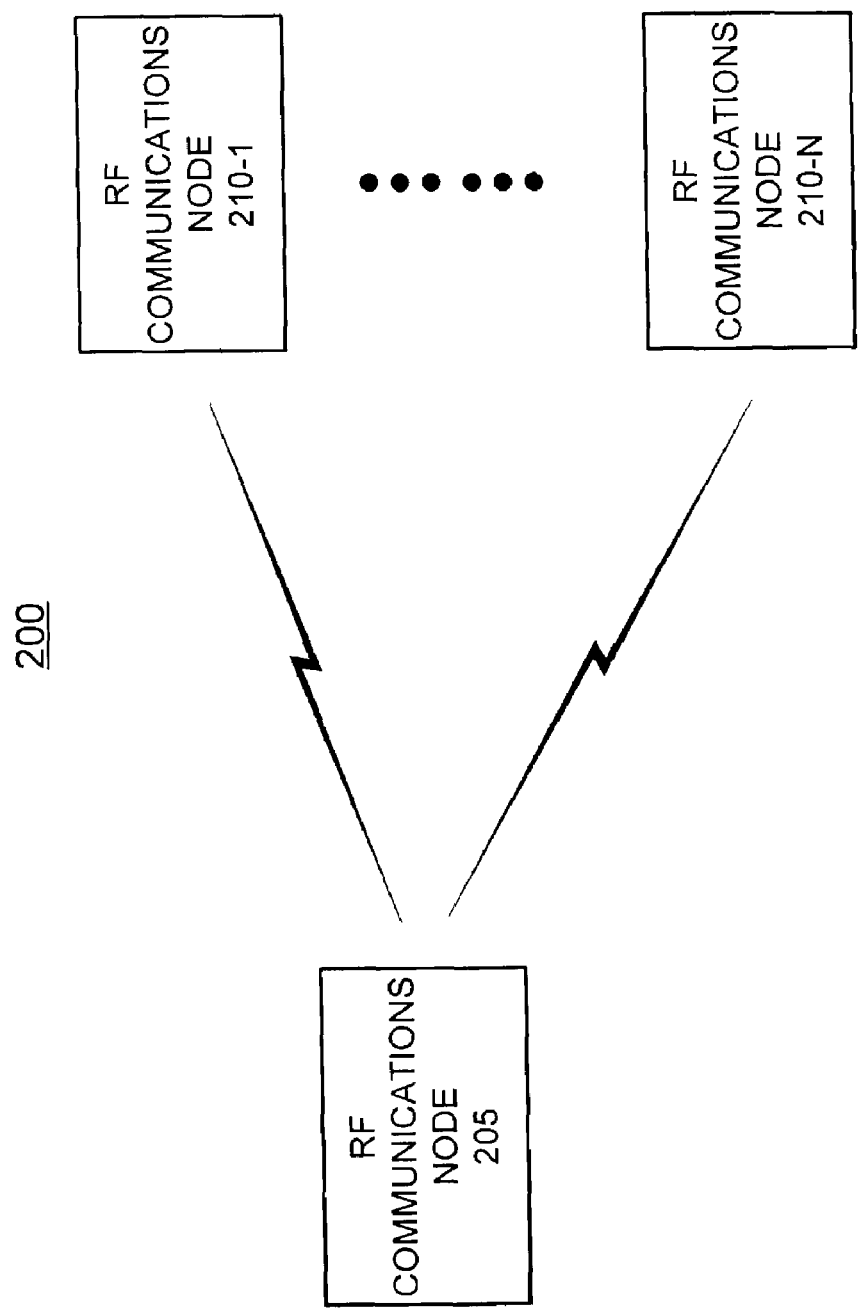
FIG. 2 illustrates exemplary radio frequency (RF) communications nodes of a portion of a radio communications network consistent with the present invention.

FIG. 2 illustrates a portion of an exemplary network 200 in which systems and methods, consistent with the present invention, may be implemented to synchronize transmitting and receiving RF communication nodes to a common reference time frame. Network 200 may include any type of conventional radio communications network, such as, for example, a cellular telephone network, a satellite network, an ad-hoc wireless network, or the like. The illustrated portion of network 200 may include multiple RF communications nodes, such as RF communications node 205 and RF communications nodes 210-1 through 210-N. RF communications nodes 205 and 210 may communicate with one another via wireless RF transmissions. In a cellular telephone network, for example, RF communications node 205 may include a base station and nodes 210 may include cellular telephones. In a satellite network, for example, RF communications node 205 may include a satellite transmitter and nodes 210 may each include fixed or mobile RF transceivers. In an ad-hoc wireless network, for example, RF communications nodes 205 and 210 may each include nodes that communicate directly with one another (i.e., not using the base stations, mobile switching stations, etc. of a cellular telephone network), or forward communications received from other nodes over multiple hops to destination nodes, and may be added or removed from the network in an ad-hoc fashion.

RF communications node 205 and nodes 210 may be similarly constructed and may include telephones, cellular radiotelephones, Personal Communications System (PCS) terminals or the like. PCS terminals may combine a cellular radiotelephone with data processing, facsimile and data communications capabilities. RF communications nodes 205 and 210 may further include personal digital assistants (PDAs), conventional laptops and/or palmtop receivers, or other devices that include radiotelephone transceivers.

Exemplary Transmitting/Receiving Node

Figure 3:
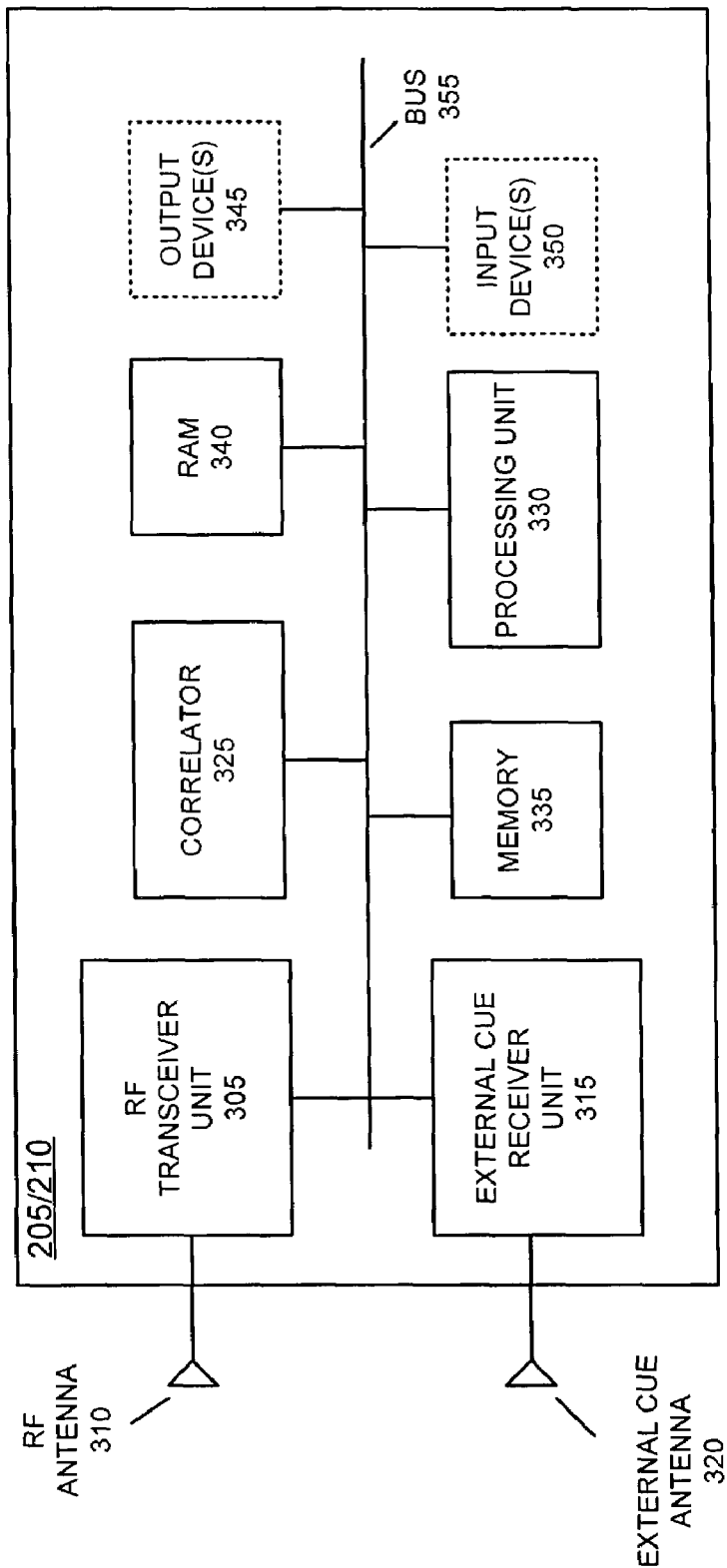
FIG. 3 illustrates exemplary components of a RF communications node of FIG. 2 consistent with the present invention.

FIG. 3 illustrates an exemplary RF communications node 210 consistent with the present invention. Node 205 may, in some exemplary embodiments, be similarly configured. Node 210 may include an RF transceiver unit 305, an RF antenna 310, an external cue receiver unit 315, an external cue antenna 320, a correlator 325, a processing unit 330, a memory 335, a random access memory (RAM) 340, an output device(s) 345, an input device(s) 350, and a bus 355.

RF transceiver unit 305 may include any type of transceiver circuitry well known to one skilled in the art for transmitting and/or receiving data in a network, such as network 200, via antenna 310. RF transceiver unit 305 may also include, in some exemplary embodiments, a UWB RF receiver. External cue receiver unit 315 may include receiver circuitry for receiving external cue signals from a source that is external to network 200 via antenna 320. Such external cues may include periodic or aperiodic cues. Periodic cues may include, for example, ultra-high frequency (UHF) television (TV) blanking interval signals, cellular telephony base station transmissions, zero-crossings in FM radio transmissions, differential Global Positioning System (GPS) signals, and specialized communication services, such as time services (e.g., LORAN C) or Muzak.

As an example, assume that UHF TV blanking interval signals are to be used as the periodic cues. The UHF TV blanking interval signals are transmitted as part of conventional TV transmission. A conventional black and white TV, for example, has only one electron gun. The single electron beam from the gun scans the TV's picture tube in an interlaced fashion from left to right and top to bottom for 252 and ½ lines called a field (e.g., NTSC standard). This scanning process repeats itself to interleave the next 252 and ½ lines to create a 525 line interlaced frame. The synchronizing information includes a series of pulses that tell the horizontal deflection section when to return to the left of the screen to start a new line, and the vertical deflection section when to return to the top of the screen to start a new frame. This is achieved by scanning the horizontal at approximately 15,750 lines per second, and the vertical at 30 frames per second (the vertical scan rate is actually 60 Hz, but it takes two trips down the screen to complete one frame). The process of returning to start a new scan is called retrace or fly-back.

The vertical retrace takes a number of horizontal scans to return to the top of the screen. During this time, the beam is blanked so other information may be sent without disturbing TV audiences. Single horizontal lines of the vertical retrace are used to send digital information (e.g., closed captioning information, time of day information, etc. on lines 16 to 21). The beginning of a particular one of these retrace lines (e.g., the TV blanking interval signal) can be used as an external cue synchronization event for a receiving node 210. The TV blanking interval signal is conventionally transmitted at a relatively high power and, thus, can be received indoors, in urban canyons, or other locations that only high power signals can reach and/or penetrate.

Aperiodic clues may include, for example, paging signals and analog voice or video signal transmissions. Paging signals may be transmitted to receiving pagers on an aperiodic "as needed" basis. The start of each paging symbol transmission may be used as an external cue for synchronization. Certain aspects of the analog or video signal waveforms may exceed limits from time to time. Each of these waveform events may be used as an external cue for synchronization. For example, a number of zero-crossings of the analog or video signal waveform may speed up or slow down depending on the information being transmitted. The rate of speed up or slow down may indicate a waveform event that can be used as an external cue.

External cue receiver unit 315 may include appropriate circuitry to receive any of the periodic or aperiodic external cues described above. For example, in the case of the use of TV blanking signals as an external cue, external cue receiver unit 315 may include the minimum necessary circuitry for receiving the UHF TV blanking signals. Correlator 325 may include conventional circuitry for pattern matching (i.e., correlating) RF signals to synchronize receiving node 210.

Processing unit 330 may perform all data processing functions for inputting, outputting, and processing of data including data buffering and node control functions, such as communication processing control, user interface control, or the like. Memory 335 may include, for example, conventional flash memory and may provide permanent or semi-permanent storage of data and instructions for use by processing unit 330. RAM 340 may provide temporary working storage of data and instructions for use by processing unit 330 in performing processing functions.

Output device(s) 345 may include conventional mechanisms for outputting data in video, audio, and/or hard copy format. Input device(s) 350 permit entry of data into receiving node 210 and may include a user interface and a microphone (not shown). The microphone can include conventional mechanisms for converting auditory input into electrical signals. Bus 355 interconnects the various components of receiving node 210 to permit the components to communicate with one another.

The configuration of components of RF communications node 210 illustrated in FIG. 3 is for illustrative purposes only. One skilled in the art will recognize that other configurations may be implemented.

Exemplary Parasitic Synchronization Process

Figure 4:
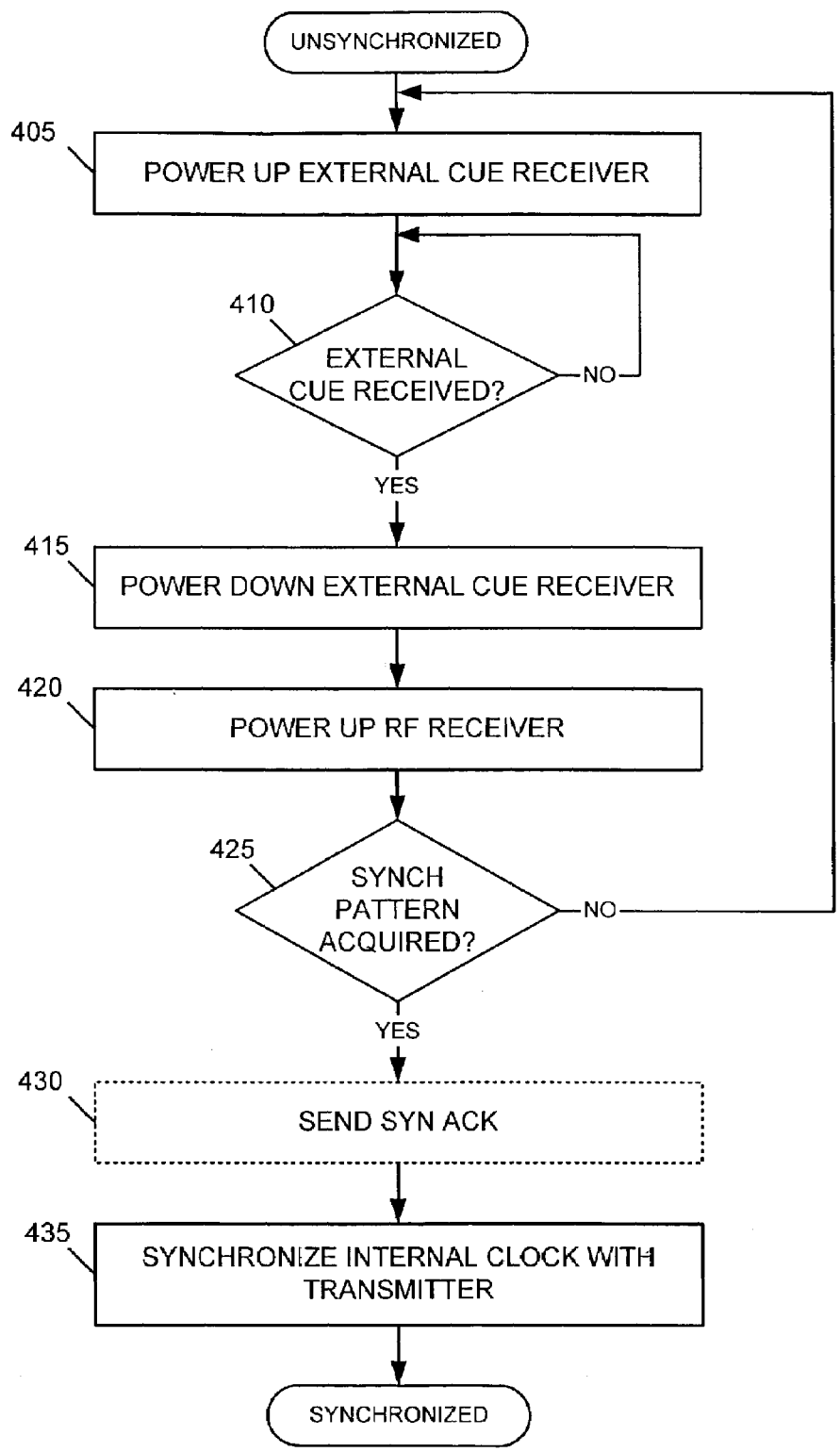
FIG. 4 is a flow chart that illustrates an exemplary parasitic synchronization process consistent with the present invention.

FIG. 4 is a flowchart that illustrates an exemplary process, consistent with the present invention, for synchronizing a node 210 to receive transmissions from another node (e.g., node 205), using periodic or aperiodic external cues already present in the environment in the vicinity of node 210. As one skilled in the art will appreciate, the method exemplified by FIG. 4 can be implemented as a sequence of instructions and stored in memory 335 for execution by processing unit 330.

The exemplary process may begin with node 210 being in an unsynchronized state relative to node 205 and with the powering up of external cue receiver unit 315 [act 405]. Processing unit 330 of node 210 may then determine whether an external cue has been received by external cue receiver unit 315 [act 410]. If the external cue has been received, external cue receiver unit 315 may be powered down [act 415]. RF transceiver unit 305 may then be powered up to receive a synchronization pattern from transmitting node 205 [act 420]. RF transceiver unit 305 may be powered up for a sufficient time t to account for propagation delay from the transmitting node 205. After time t has expired, RF transceiver unit 305 may be powered down. Processing unit 330 may determine if the synchronization pattern has been received by RF transceiver unit 305 [act 425]. If so, a synchronization acknowledgement (SYN ACK) may, optionally, be sent via RF transceiver unit 305 [act 430].

An internal clock of receiving node 210 may then be synchronized to the transmitter using, for example, a conventional pattern matching algorithm implemented in correlator 325 [act 435]. Subsequent to successful execution of the pattern matching algorithm by correlator 325, receiving node 210 will be synchronized for receiving transmissions from node 205. If the synchronization pattern has not been received in act 425, the exemplary process may return to act 405 with the powering up of external cue receiver unit 315 to receive another external cue.

Exemplary Parasitic Synchronization Timing

Figure 5:
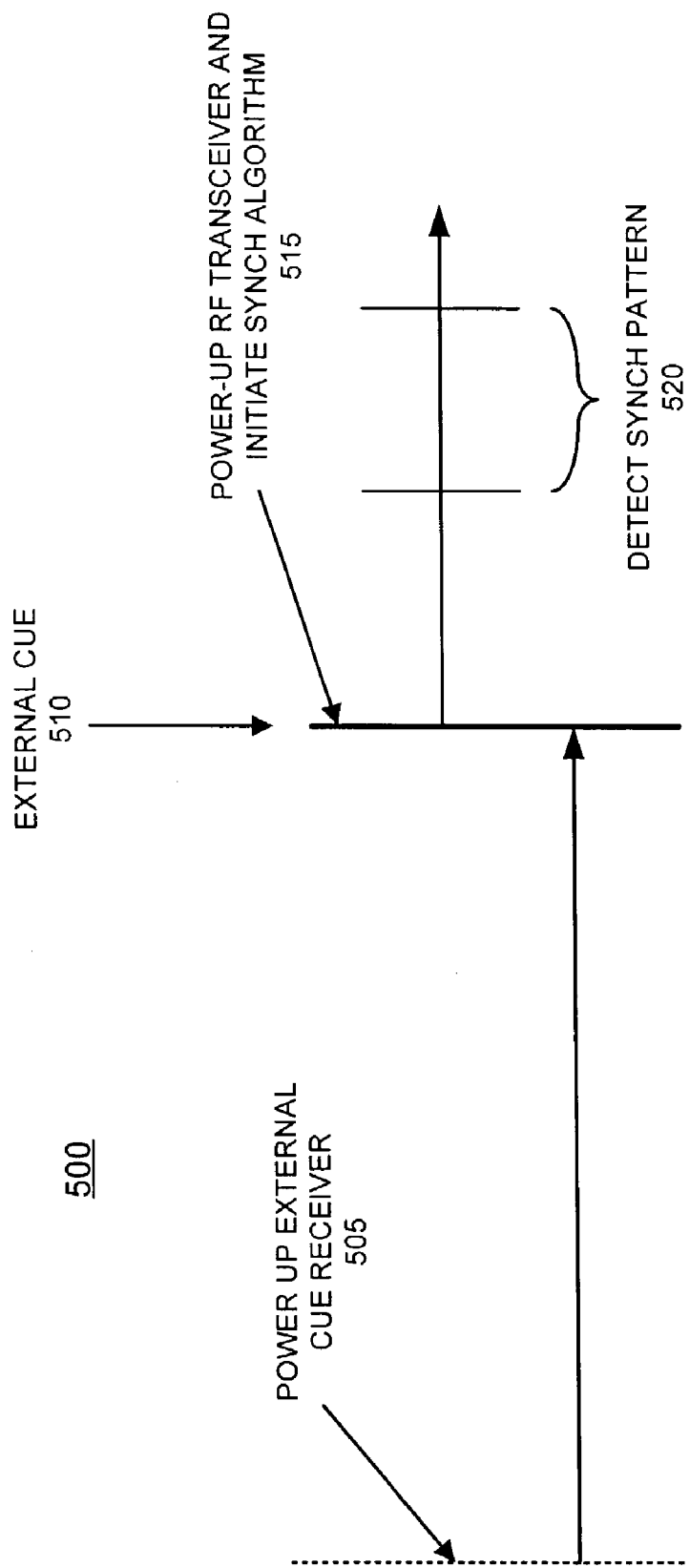
FIG. 5 is a diagram illustrating exemplary parasitic synchronization timing at a receiving node of the network of FIG. 2 consistent with the present invention.

FIG. 5 is an exemplary diagram that illustrates timing of the parasitic synchronization process consistent with the present invention. At 505, external cue receiver unit 315 may be powered up to receive an external cue. An external cue may be received at 510, after which, at 515, RF transceiver unit 305 may be powered up to receive the synchronization pattern, and the synchronization algorithm executed by correlator 325 may be initiated. At 520, RF transceiver unit 305 may detect the synchronization pattern. Subsequent to detection of the synchronization pattern, correlator 325 may synchronize receiving node 210 to the transmitting node 205.

Exemplary Synchronization Pattern Transmission Process

Figure 6:
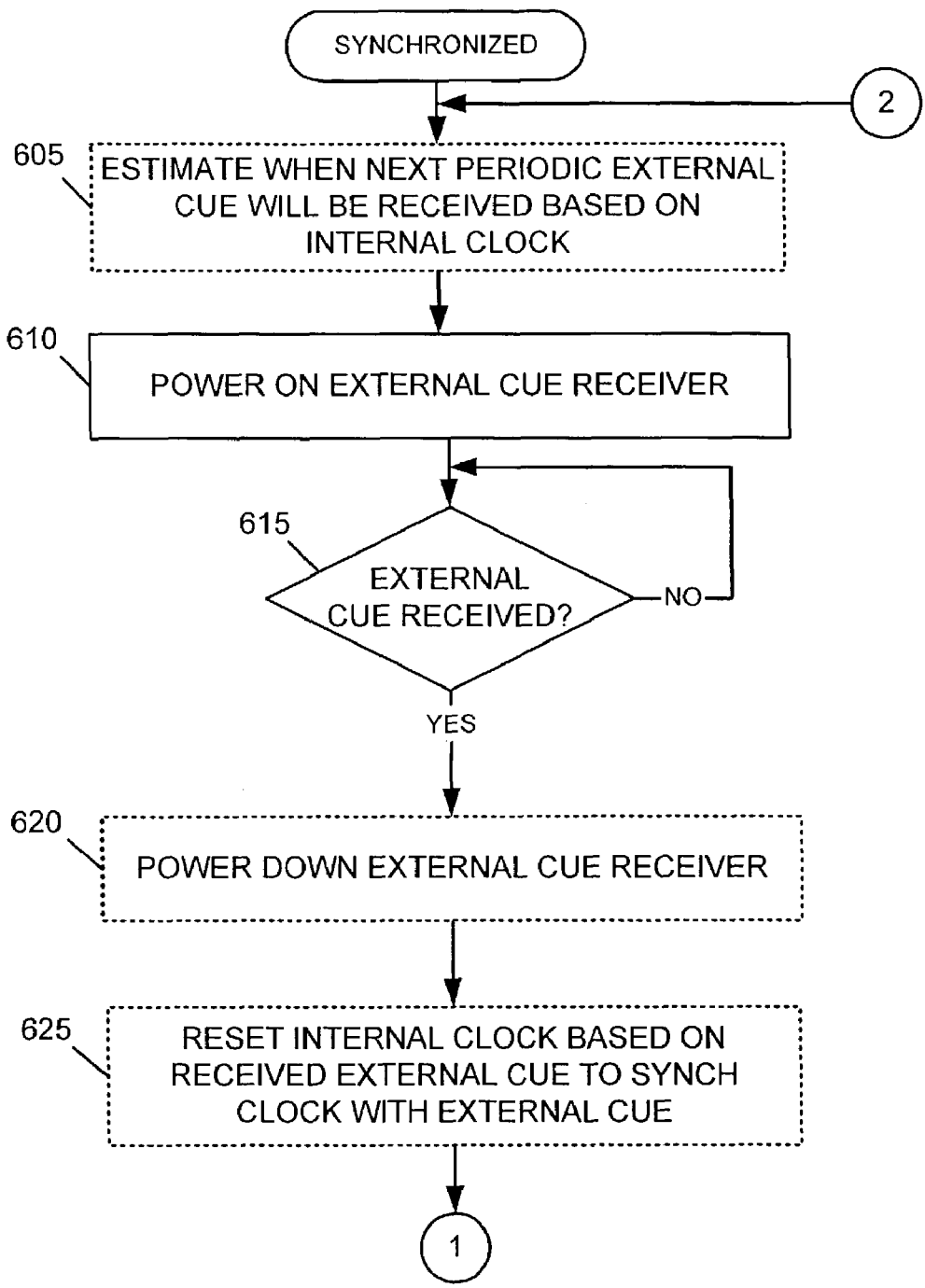
FIGS. 6-7 are flow charts that illustrate an exemplary synchronization pattern transmission process consistent with the present invention.
Figure 7:
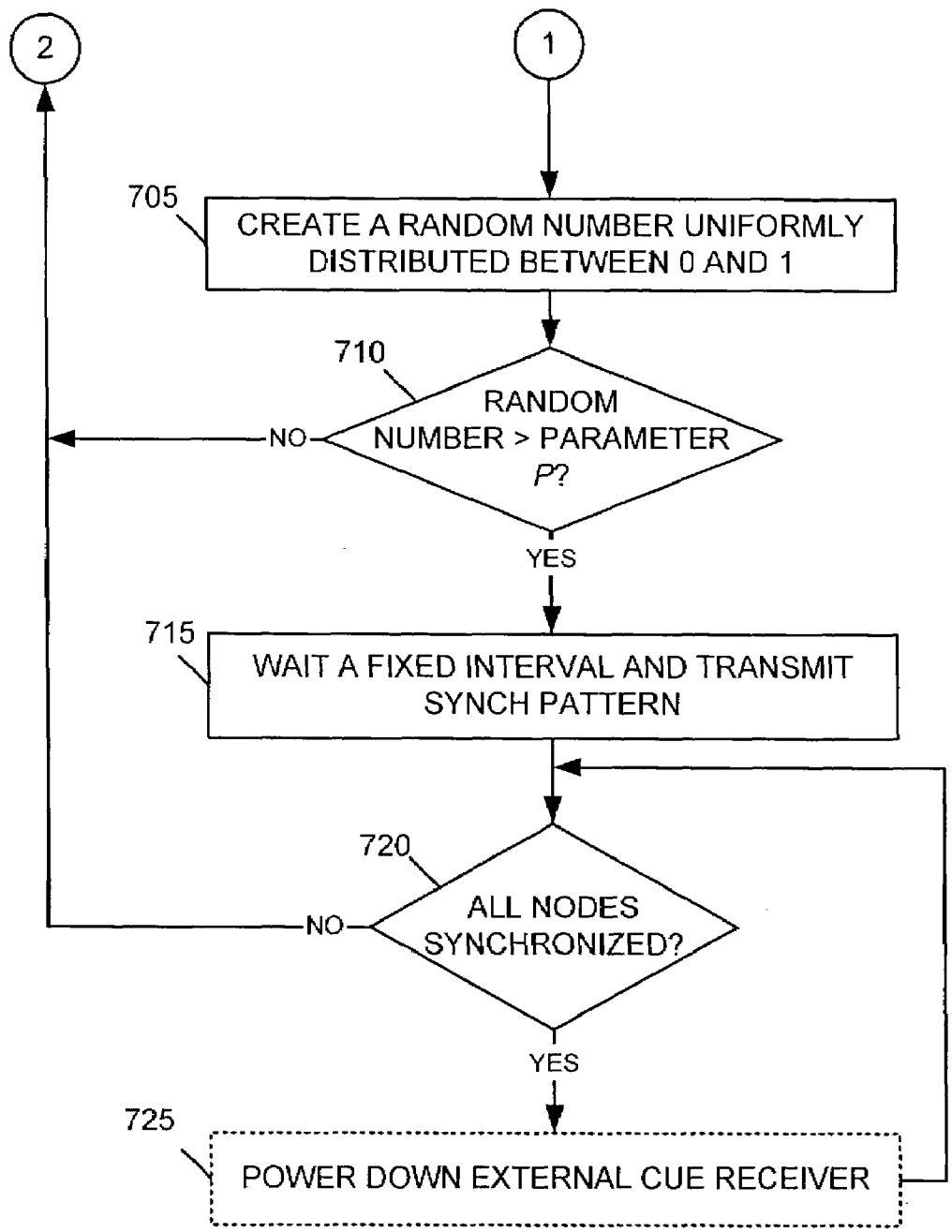

FIGS. 6-7 are flowcharts that illustrate an exemplary process, consistent with the present invention, for transmitting synchronization patterns from nodes 205/210 of network 200. As one skilled in the art will appreciate, the method exemplified by FIGS. 6-7 can be implemented as a sequence of instructions and stored in memory 335 for execution by processing unit 330. The exemplary process of FIGS. 6-7 may be implemented by nodes 205/210 of network 200 that have already been synchronized in accordance with, for example, the exemplary process of FIG. 4.

If periodic external cues are being employed to assist in the synchronization process, the exemplary process may begin with processing unit 330 estimating a receipt time of a next periodic external cue based on the node's 205/210 own internal clock [act 605](FIG. 6). Processing unit 330 may initiate the powering up of external cue receiver unit 315 based on this estimate [act 610]. In the case of periodic external cues, for example, external cue receiver unit 315 may be powered up just prior to the estimated time when the next periodic external cue should be received. In the case of aperiodic external cues, external cue receiver unit 315 may be powered on continuously to ensure receipt of the aperiodic external cues. Processing unit 330 may then determine if an external cue was received by external cue receiver unit 315 [act 615]. If the external cue is a periodic signal, then external cue receiver unit 315 may, optionally, be powered down [act 620] and the node 205/210's internal clock may, optionally, be reset to synchronize the clock to the periodic external cue [act 625].

Processing unit 330 may create a random number uniformly distributed between 0 and 1 [act 705](FIG. 7). The uniformly distributed random number may be generated, for example, by any conventional random number generation technique. Processing unit 330 may then determine whether the created random number is greater than a pre-specified parameter P [act 710]. The pre-specified parameter P may include any value within the range 0<P≦1. If the created random number is not greater than parameter P, then no synchronization pattern will be transmitted, and the process may return to act 605 (FIG. 6). If the created random number is greater than parameter P, then processing unit 330 may wait a fixed interval before initiating the transmission of an RF pulse train, representing the synchronization pattern, via RF transceiver unit 305 [act 715]. This fixed delay interval may account for the maximum propagation time needed for the external cue to reach a receiving node before a synchronization pattern is transmitted. Parameter P may be selected based on the desired frequency of synchronization pattern transmission. For example, if P is chosen to be 1, then node 205/210 may transmit a synchronization pattern after the receipt of every external cue. As another example, if P is chosen to be 0.5, then receiving node 205/210 may transmit a synchronization pattern approximately 50% of the time after receiving an external cue.

A determination may then be made whether all nodes in network 200 have been synchronized to each other [act 720]. Records of received synchronization acknowledgements (SYN ACKs) may be retained at each node 205/210 of network 200, or at a central location, such as a mobile switching center in the case of a cellular network, to determine whether each node of network 200 has been synchronized. Therefore, if the total expected population of a network is known in advance, the nodes 205/210 will know, based on the records, whether all nodes in the network have been synchronized. If all nodes in network 200 have not been synchronized to each other, synchronization pattern transmission may continue by returning to act 605 (FIG. 6). If all nodes in network 200 have been synchronized to each other, then, if the external cues include aperiodic external cues, node 205/210 may power down external cue receiver unit 315 [act 725]. If the external cues include periodic cues, however, then external cue receiver unit 315 may have already been powered down at act 620 above.

External cue receiver unit 315 may be maintained in a powered down state, thus, conserving energy, until it is determined that one or more nodes in network 200 have become unsynchronized. A node may become unsynchronized, for example, when the node is turned off, when it moves out of radio range with other nodes in network 200, or when it undergoes some type of system failure. In a cellular network, for example, a mobile switching center may monitor the synchronization status of nodes in its area and transmit a network wide notification notifying all nodes when a node "drops out" of network 200 and may require re-synchronization. In an ad-hoc network, for example, each node 205/210 may monitor the synchronization status of nodes of all nodes with which it is communicating, and may forward data indicating these synchronization statuses on to other nodes in network 200. In this manner, each node 205/210 in the ad-hoc network can be apprised of the synchronization status of all other nodes in the network.

CONCLUSION

Systems and methods consistent with the present invention provide mechanisms for using external cues that may be generated outside of an RF network to initiate the powering up of RF receiver and correlation circuitry of a receiving device. The RF receiver and correlation circuitry may be used, subsequent to power up, to acquire and correlate a synchronization pattern transmitted by a transmitting device in the RF network. The external cues can be used as reference points at which the transmitting device transmits synchronization patterns, and the receiving device powers up its RF transceiver and correlation circuitry to receive the synchronization patterns. The amount of time the RF transceiver need be powered on for receiving the synchronization pattern may, therefore, be decreased, and the correlation/pattern matching time associated with synchronizing the receiving device may also be decreased. These decreases in RF transceiver power up time and pattern matching time reduce energy demands on the receiving device and, therefore, permit longer operation on a limited energy supply, such as a battery or fuel cell.

The foregoing description of embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in hardware and others in software, other configurations may be possible. Additionally, other periodic or aperiodic external cues may be used, in addition to those described above, such as, for example, cellular telephony control channel signals, cellular telephony traffic channel signals, digital sub-bands for AM or FM radio station signals, digital or analog signals in short-wave radio transmissions, digital television signals, digital or analog signals in land mobile radio transmissions, radio-navigation signals, radar signals, satellite signals, acoustic events or signals, magnetic events or signals, or optical events or signals.

While series of acts have been described in FIGS. 4 and 6-7, the order of the acts may vary in other implementations consistent with the present invention. Also, non-dependent acts may be performed in parallel. No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the following claims and their equivalents.

What is claimed is:

1. A method of synchronizing a receiving node to a transmitting node in a network, comprising:

receiving an aperiodic cue at a first receiver of the receiving node from a source external to the receiving node that does not include the transmitting node;

powering up a second receiver at the receiving node responsive to receipt of the aperiodic cue;

receiving a synchronization pattern from the transmitting node at the second receiver; and synchronizing the receiving node to the transmitting node using the synchronization pattern.

2. The method of claim 1, wherein the aperiodic cue is transmitted from a source external to the network.

3. The method of claim 2, wherein the aperiodic cue comprises at least one of a paging signal, an analog voice signal, or an analog video signal.

4. The method of claim 1, wherein the receiving node and transmitting node comprise radio frequency communication nodes.

5. The method of claim 1, wherein the aperiodic cue comprises at least one of a paging signal, an analog voice signal, or an analog video signal.

6. The method of claim 1, wherein the second receiver comprises an ultra-wide band radio frequency receiver.

7. A radio frequency (RF) receiving node, comprising:

a first receiver configured to receive a synchronization pattern from an RF transmitting node;

a second receiver configured to receive an aperiodic cue from a source external to the RF receiving node, wherein the external source does not include the RF transmitting node;

a processing unit configured to power up the first receiver at the RF receiving node responsive to receipt of the aperiodic cue; and a correlator configured to synchronize the RF receiving node to the RF transmitting node using the received synchronization pattern.

8. The node of claim 7, wherein the RF receiving node and RF transmitting node are associated with a first network.

9. The node of claim 8, wherein the aperiodic cue is transmitted from a source external to the first network.

10. The node of claim 9, wherein the aperiodic cue comprises at least one of a paging signal, an analog voice signal, or an analog video signal.

11. The node of claim 7, wherein the aperiodic cue comprises at least one of a paging signal, an analog voice signal, or an analog video signal.

12. The node of claim 7, wherein the second receiver comprises an ultra-wide band RF receiver.

13. A computer-readable medium containing instructions for controlling at least one processor to perform a method of synchronizing a receiving node to a transmitting node in a network, the method comprising:

obtaining an aperiodic cue received by a first receiver of the receiving node from a source external to the receiving node that does not include the transmitting node;

powering up a second receiver at the receiving node responsive to receipt of the aperiodic cue;

obtaining a synchronization pattern received by the second receiver from the transmitting node; and synchronizing the receiving node to the transmitting node using the obtained synchronization pattern.

14. A method of synchronizing a receiving node to a transmitting node in a network, comprising:

receiving an external cue, transmitted from a node other than the transmitting node that is external to the receiving node, at a first receiver of the receiving node;

powering up a second receiver at the receiving node responsive to receipt of the external cue;

receiving a synchronization signal from the transmitting node at the second receiver; and determining when the transmitting node started transmitting the synchronization signal in a reference timeframe common to both the transmitting node and the receiving node.

15. The method of claim 14, wherein the external cue comprises at least one of a television blanking signal, a zero-crossing of a FM radio transmission, a paging system signal, a zero-crossing of an analog voice transmission, a zero-crossing of an analog video transmission, a cellular telephony control channel signal, a cellular telephony traffic channel signal, a digital sub-band for an AM or FM radio station signal, a digital or analog signal in a short-wave radio transmission, a digital television signal, a digital or analog signal in a land mobile radio transmission, a radio-navigation signal, a radar signal, a satellite signal, an acoustic event or signal, a magnetic event or signal, or an optical event or signal.

16. The method of claim 14, wherein the second receiver comprises an ultra-wide band RF receiver.

17. The method of claim 14, wherein the external cue is transmitted from a source external to the network.

18. The method of claim 14, wherein the receiving node and transmitting node comprise RF communication nodes.

19. A radio frequency (RF) receiving device, comprising:

a first receiver configured to receive a synchronization signal from a RF transmitting device;

a second receiver configured to receive an external cue from a source external to the RF receiving device that does not include the RF transmitting device;

a processing unit configured to power up the second receiver of the RF receiving device responsive to receipt of the external cue; and a correlator configured to synchronize the RF receiving device to the RF transmitting device based on the synchronization signal.

20. The device of claim 19, wherein the external cue comprises at least one of a television blanking signal, a zero-crossing of a FM radio transmission, a paging system signal, a zero-crossing of an analog voice transmission, a zero-crossing of an analog video transmission, a cellular telephony control channel signal, a cellular telephony traffic channel signal, a digital sub-band for an AM or FM radio station signal, a digital or analog signal in a short-wave radio transmission, a digital television signal, a digital or analog signal in a land mobile radio transmission, a radio-navigation signal, a radar signal, a satellite signal, an acoustic event or signal, a magnetic event or signal, or an optical event or signal.

21. The device of claim 19, wherein the second receiver comprises an ultra-wide band RF receiver.

22. The device of claim 19, wherein the RF receiving device and RF transmitting device are associated with a first network.

23. The device of claim 22, wherein the external cue is transmitted from a source external to the first network.

24. A system for synchronizing a receiving node to a transmitting node in a network, comprising:

first receiving means for receiving an external cue, transmitted from a node other than the transmitting node and that is external to the receiving node, at the receiving node, the external cue comprising at least one of a television blanking signal, a zero-crossing of a FM radio transmission, a zero-crossing of an analog voice transmission, a zero-crossing of an analog video transmission, a cellular telephony control channel signal, a cellular telephony traffic channel signals, a digital sub-band for an AM or FM radio station signal, a digital or analog signal in a short-wave radio transmission, a digital television signal, a digital or analog signal in a land mobile radio transmission, a radio-navigation signal, a radar signal, a satellite signal, an acoustic event or signal, a magnetic event or signal, or an optical event or signal;

second receiving means for receiving a synchronization signal from the transmitting node; and means for powering up the second receiving means at the receiving node responsive to receipt of the external cue; and means for determining when the transmitting node started transmitting the synchronization signal in a reference time-frame common to both the transmitting node and the receiving node.

25. A method of conserving energy in a first radio frequency (RF) node of a network comprising a plurality of RF nodes, the method comprising:

determining whether all RF nodes in the network are synchronized;

powering down an external cue receiver of the first RF node based on the determination;

powering up the external cue receiver if an RF node of the plurality of RF nodes becomes unsynchronized;

receiving an external cue at the external cue receiver of the first RF node, the external cue comprising at least one of a television blanking signal, a zero-crossing of a FM radio transmission, a zero-crossing of an analog voice transmission, a zero-crossing of an analog video transmission, a cellular telephony control channel signal, a cellular telephony traffic channel signals, a digital sub-band for an AM or FM radio station signal, a digital or analog signal in a short-wave radio transmission, a digital television signal, a digital or analog signal in a land mobile radio transmission, a radio-navigation signal, a radar signal, a satellite signal, an acoustic event or signal, a magnetic event or signal, or an optical event or signal; and transmitting a synchronization pattern to the plurality of RF nodes based on the received external cue.

26. The method of claim 25, wherein the RF nodes comprise ultra-wide band RF nodes.

27. A radio frequency (RF) receiving device, comprising:

a processing unit configured to determine whether all RF nodes of a plurality of RF nodes in a network are synchronized;

a first receiving unit configured to power down based on the determination, wherein the first receiving unit powers up when an RF node of the plurality of RF nodes becomes unsynchronized and wherein the first receiving unit receives an external cue, the external cue comprising at least one of a television blanking signal, a zero-crossing of a FM radio transmission, a zero-crossing of an analog voice transmission, a zero-crossing of an analog video transmission, a cellular telephony control channel signal, a cellular telephony traffic channel signal, a digital sub-band for an AM or FM radio station signal, a digital or analog signal in a short-wave radio transmission, a digital television signal, a digital or analog signal in a land mobile radio transmission, a radio-navigation signal, a radar signal, a satellite signal, an acoustic event or signal, a magnetic event or signal, or an optical event or signal; and a transmitter configured to transmit a synchronization pattern to the plurality of RF nodes based on the received external cue.

28. The device of claim 27, wherein the RF nodes comprise ultra-wide band RF nodes.

* * * * *